May 23, 1961  W. O. NIXON  2,985,181
HYDRAULIC COMPUTER SYSTEM
Filed May 13, 1955
4 Sheets-Sheet 2

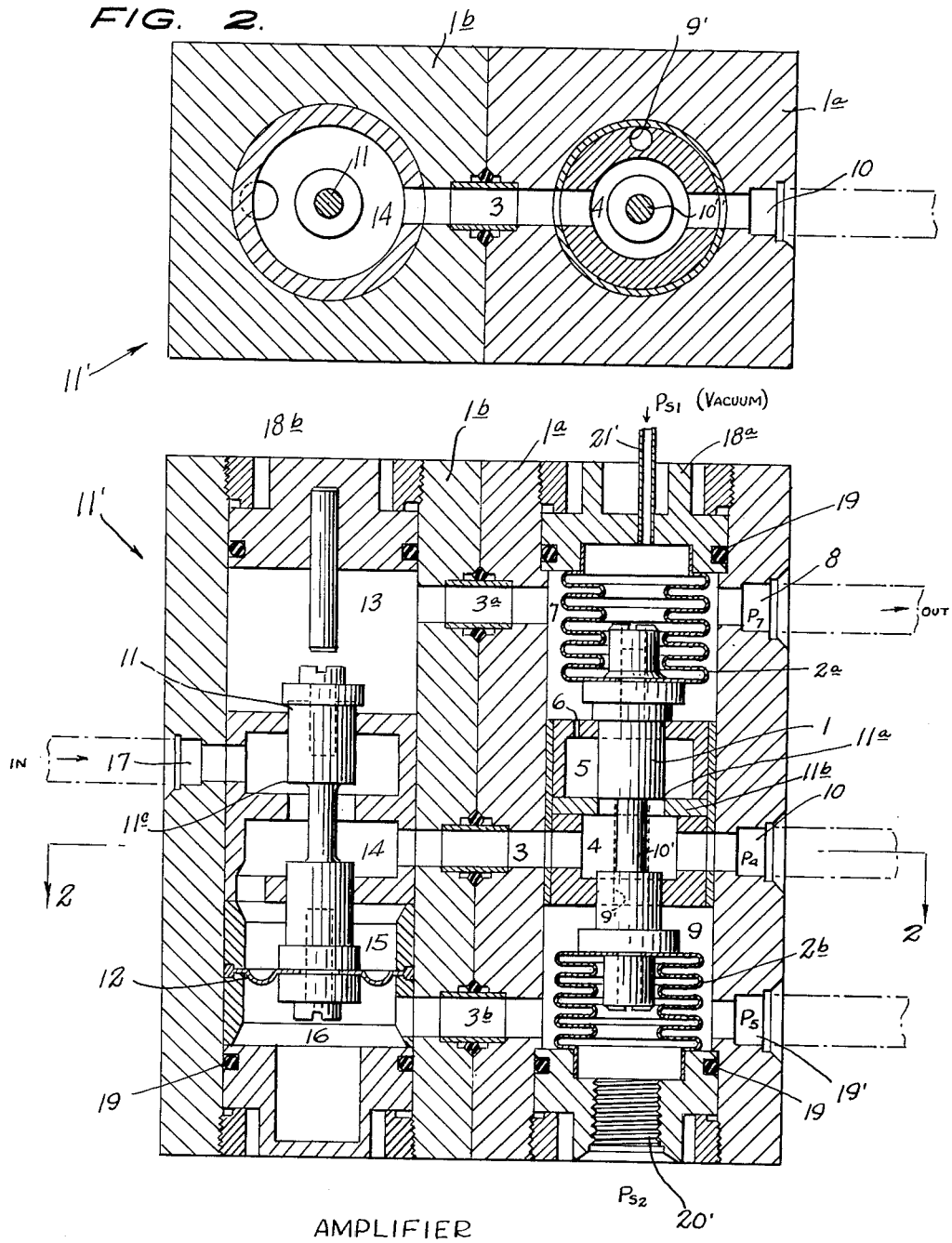

PRESSURE DROP REGULATOR

METERING VALVE

INVENTOR.
WILLIAM O. NIXON,
BY
McMorrow, Berman & Davidson
ATTORNEYS.

INVENTOR.
WILLIAM O. NIXON,
BY
McMorrow, Berman + Davidson
ATTORNEYS.

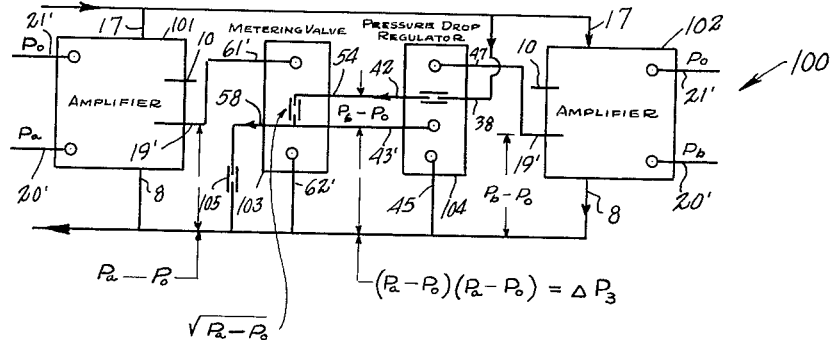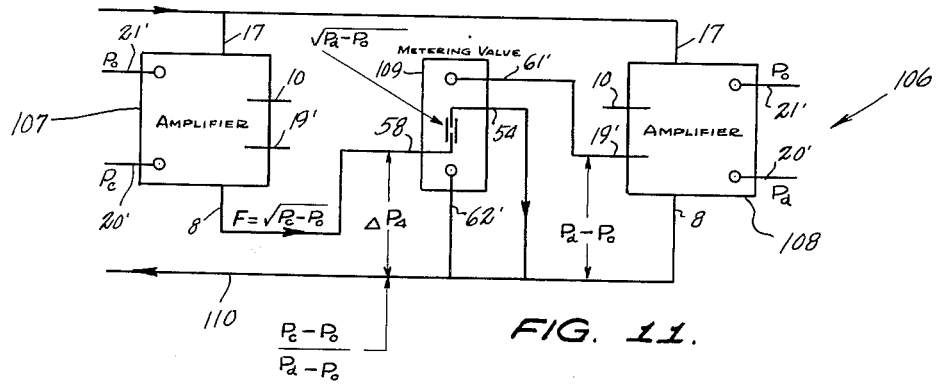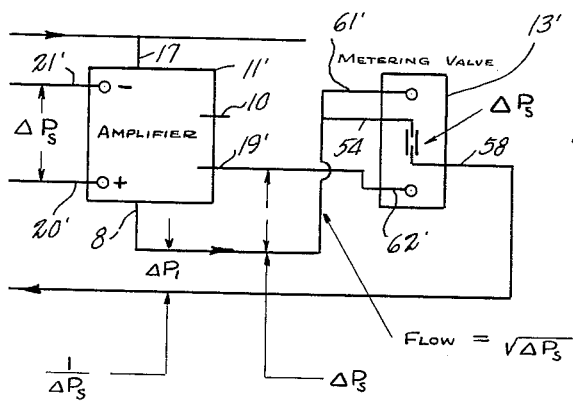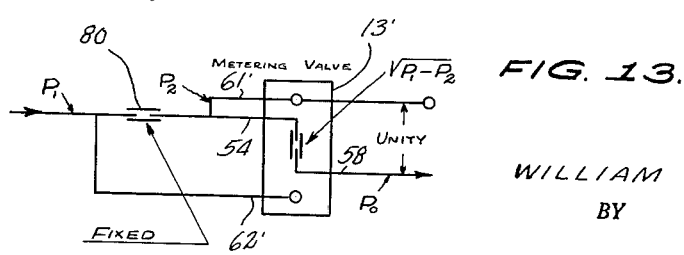

United States Patent Office 2,985,181
Patented May 23, 1961

2,985,181

HYDRAULIC COMPUTER SYSTEM

William O. Nixon, Grosse Pointe Woods, Mich. (4242 Glendale-Millford Road, Cincinnati, Ohio)

Filed May 13, 1955, Ser. No. 508,145

21 Claims. (Cl. 137—85)

This invention relates to hydraulic devices, and more particularly to systems of hydraulic devices arranged to operate as computers. Embodiments of the invention serve to automatically function to impose a particular mathematical expression of an input signal on its output and the resultant output will be a slave to the input signal. "Droop" is completely eliminated in the function thereof.

In their preferred form, the invention embodiments can be employed where signals can be derived from pressures or variables which can be converted to pressures; such as temperature, which may be converted to pressure by means of a temperature bulb; or shaft speed, which may be converted into a pressure differential by means of a centrifuge or ball governor to produce a mechanical force on a bellows or diaphragm, or similar variables.

Still more specifically, the present invention is concerned with a system which employs hydraulic pressure in a manner analogous to the way in which plate voltage is employed in an electronic tube, the devices of the present invention being supplied with signal pressures analogous to the signals applied to grids of electronic tubes, the signal pressures being arranged to develop outlet pressures in the devices representing known functions, for example, algebraic expressions of the signal pressures being fed into the devices.

Further, devices of the present invention may be employed to compute and develop a mathematical or graphical expression of one or more input signals in their outputs which may involve addition, subtraction, multiplication, division, square roots, exponential functions having positive or negative exponents, either whole or fractional, in any function of one parameter to another, whether mathematical or diagrammatical, or any complex combination of the above with respect to the signals received.

Devices according to the present invention may be advantageously applied to fuel systems of a power plant, and more particularly to aircraft power plants because of the computations inherently necessary in the case of such power plants, dealing in altitude pressure, ram pressure, compressor inlet pressure, compressor outlet pressure, manifold pressure, ambient air temperature, ram temperature, compressor inlet temperature, compressor outlet temperature, true and corrected engine speeds, true and corrected fuel flows, and the like. However, it should be kept in mind that the application of the present invention is not so limited.

Devices according to the present invention can also be arranged to compute and indicate true air speed or Mach number, using ambient pressure, ambient temperature, pitot pressure, or any other variables affecting the computation of true air speed.

Many of the devices heretofore employed to regulate and amplify a pressure, or a pressure drop, are highly complicated and generally are characterized by droop and nonlinearity. This is due to the effect of extraneous factors such as variations in supply pressure, drain pressures, and the like. Effort is usually made to compensate for these factors by means of a considerable amount of special contouring of cams, levers, and the like.

For purposes of this disclosure it should be understood that "droop" is the error in the output of a system which results from parameters not inherent in the signals introduced in the system, such as temperature and supply and drain pressure.

The devices of the prior art may employ pistons, diaphragms, or bellows to receive the forces associated with the various hydraulic pressures employed in the system in which they are incorporated. The use of pistons is disadvantageous, since pistons are affected by friction, especially so if they are of large circumference and of close fit to their respective cylinder bores to minimize leakage. Moreover, regardless of the closeness of the fit some leakage is always present.

Diaphragms may be employed instead of pistons to eliminate the effects of sliding friction and leakage incident to the use of pistons. However, unless the diaphragms are thin, their distortion requires a force which results in inaccuracy in the results transmitted. Thin diaphragms may be employed but they are limited in rupture strength and can only be used to separate pressures of relatively small differentials. The diaphragm has the advantage in that fluid leakage through its pores is insignificant, but diaphragms have a disadvantage in that they cannot be used to seal off vacuum, as vacuum capsules must be permanently and perfectly air and gas tight.

Bellows have the advantage in that they have insignificant structural friction, within limited movements, and will maintain a vacuum. They are also obtainable in a wide variety of strengths, but all bellows have an inherent "spring rate." This "spring rate" usually causes "droop" in the system in which they are employed. Bellows are also limited in degree of extension or contraction.

The present invention embodiments can employ bellows to maintain a vacuum in a manner whereby the "spring rate," or "drop," of the bellows cannot affect their computing function, nor is the "spring rate," or "droop" evidenced in the computation which they effect in imposing a particular mathematical expression of an input signal on their output.

Since a device constructed in accordance with the present invention is essentially a computer and not necessarily a flow regulator proper, such a device can also employ thin diaphragms and can affect a flow regulator, fuel system, or the like, and cause such flow regulator or fuel system to function properly without the diaphragms of the device being subjected to excessive pressure differentials. For the same reasons the invention enables the employment of pistons which are all small in circumference and are used in such a way that leakage past them does not affect accurate computation.

Accordingly, it is a major object of the present invention to provide basic devices, which may be employed independently or in combination, each device being capable of considerable variations in dimensions, effective areas, and area ratios, and each being capable of a wide range of variation of use within many different schematic systems, but each having one basic function which can be coupled into the different schematic systems to impose a particular mathematical expression of input signals on their output in a manner to make their output a slave to the input signals.

A further object of the invention is to provide novel hydraulic amplifiers, each of which has particular functional characteristics related to precise mathematical expressions of input signals.

It is a further object of the present invention to provide the above mentioned five basic devices in a manner that the respective devices may be employed singly and in combination in various schematic systems to perform required computations.

It is a still further object of the present invention to provide the basic computing elments above mentioned in a relatively small size so that the elements may be employed for qualitative computation and so as to require only a small amount of hydraulic power; the output of a system of such units can then be employed to operate and control similar devices on a larger scale which have full capacity to handle the main fuel or other flow of an engine, regardless of the quantitative requirements; by such an arrangement, the same miniature units and system of units will suffice for any engine regardless of the quantitative requirements of that engine.

A still further object of the invention is to provide miniature computer units which may be duplicated on a larger scale to define main quantitative control elements arranged to accurately respond to the miniature computing units and systems of such miniature computing units.

Further objects and advantages of the invention will become apparent from the following description and claims, and from the accompanying drawings, wherein:

Figure 1 is a vertical cross sectional view showing the details of an amplifier unit constructed in accordance with the present invention, arranged to convert a gas or liquid pressure differential into a higher but proportional liquid pressure differential, provided, with stabilizing means wherein "spring rate," or "droop," is eliminated.

Figure 2 is a horizontal cross sectional view taken on the line 2—2 of Figure 1.

Figure 9:
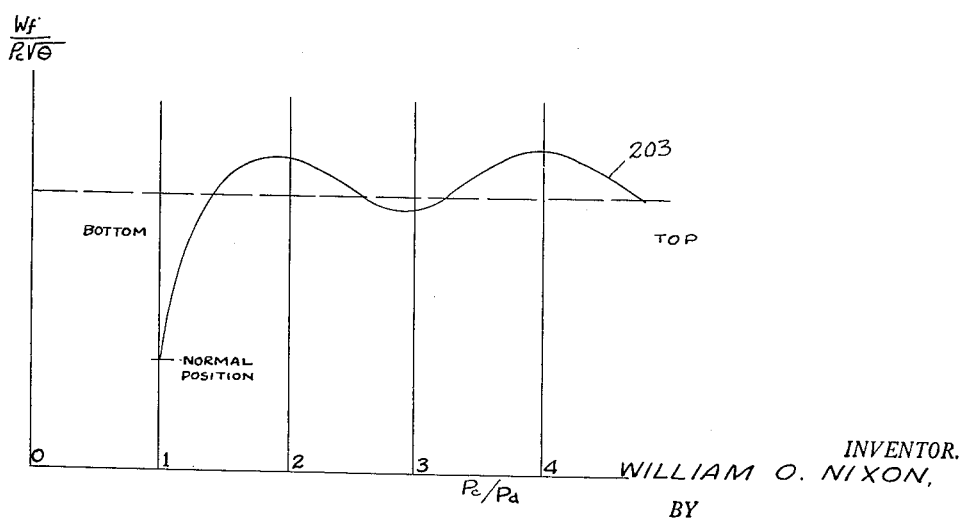

Figure 9 is a typical engine charateristic curve showing the relationship of a first function, namely, the fuel flow divided by compressor discharge pressure times the square root of absolute temperature, to the value of compressor discharge pressure divided by ram pressure, inherent in a particular engine, and providing the necessary curve to which the contour of the movable valve element of a hydraulic positioner in the fuel supply of the system must be matched to provide in effect a constant value for the function represented by fuel flow divided by the product of compressor discharge pressure and square root of absolute temperature.

Figure 10 is a schematic diagram of a computer arrangement employing elements according to the present invention and arranged to derive a specific function of two pressure signals.

Figure 11 is a schematic diagram of another hydraulic computer according to the present invention and employing the elements of this invention, arranged to derive a further specific function of two pressure signals.

Figure 12 is a schematic diagram of a computer employing elements according to the present invention, arranged to derive the reciprocal of one input pressure differential signal.

Figure 13 is a schematic diagram of a further hydraulic computer employing elements of the present invention and arranged to derive a fixed pressure differential regardless of supply or signal pressures.

Referring to the drawings, and more particularly to Figures 1 and 2 11' designates generally one of the basic units provided by the present invention, namely, an amplifier which is arranged to convert a gas or liquid pressure differential into a higher but proportional liquid pressure differential.

The amplifier 11' comprises a main amplifier segment 1a to which is connected the amplifier stabilizer segment 1b, said segments comprising respective housings, as shown. The segments may be integrated in a single housing, if desired. As shown, the segments communicate with each other at the horizontal bores 3, 3a and 3b. Referring to the main amplifier segment 1a, in this segment a valve pin 1 with a cross sectional area of V is mounted between opposing bellows 2a and 2b with effective areas of B. Valve pin 1 extends axially through a generally cylindrical, spool-like member 11b which is rigidly secured in the intermediate portion of the cylindrical bore of segment 1a said spool-like member being formed with an upper cylindrical cavity 5 and a lower cylindrical cavity 4, said cavities being separated by a centrally apertured horizontal wall through which the reduced portion 10' of valve pin 1 extends. The rear portion of said spool-like member, as viewed in Figures 1 and 2, is formed with a vertical bore 9' providing free communication between space 5 and the space 9 below said spool-like member. Under conditions wherein all pressures are equal, and wherein the bellows are free of spring tension or parasitic forces, the valve edge, shown at 11a, is in a normal position providing a normal orifice area $b$ with respect to the central aperture in the above mentioned wall between cavities 5 and 4. Horizontal bore 3 extends through the diametrically opposed wall portions of the cavity 4. As the pressures acting on the device vary, the valve pin 1 will assume other positions, but under any set of conditions, the forces tending to open the valve will be $$P_{s2}B + P_4V + P_7(B-V)$$

The forces tending to close the valve will be $$P_{s1}B + P_4V + P_5(B-V)$$

The valve then moves to a position causing the above forces to be equal. At equilibrium of said forces $$P_5 - P_7 = (P_{s2} - P_{s1})\left(\frac{B}{B-V}\right) \pm S$$

In the above expressions $P_{s2}$ is the pressure applied in the lower bellows $2b$, $P_4$ is the fluid pressure existing at a passage 10 communicating with the space 4 in the main segment 1a of the amplifier adjacent the reduced intermediate portion 10' of the valve pin 1, $P_7$, is the fluid pressure applied in the upper space 7 of main segment 1a adjacent the upper bellows 2a, and communicating with the passage 8 of Figure 1, $P_{s1}$ is the fluid pressure existing in the upper bellows 2a, $P_5$ is the fluid pressure in the space 5 adjacent the upper portion of the pin 1 as well as in the space 9, and S is the pressure effect of the spring tension of the bellows.

Only when S is equal to zero, as it will be when the valve orifice area equals its normal value of $b$, will $(P_5-P_7)$ be directly proportional to $(P_{s2}-P_{s1})$ the proportionality being $$\frac{B}{(B-V)}$$

a fixed and constant value. Let us now consider the amplifier segment 1a in the instance it were operating alone. Note that when the valve pin 1 is displaced, the fluid flow is through the passage 3 to chamber 4, past the valve edge 11a to chamber 5, through a fixed area orifice 6 to the upper bellows chamber 7, and out of the amplifier segment through a passage 8.

Considering amplifier segment 1a alone, should the pressure in passage 3 and chamber 4 increase, causing the pressure in chamber 5 to increase a lesser amount than in chamber 4, then the pressure in chamber 9, which communicates with chamber 5 through vertical bore 9', will also increase a lesser amount and the forces tending to close the valve will exceed the forces tending to open the valve, and the valve will move toward closing position until equilibrium is again obtained according to the above discussion. The valve would now be in a more nearly closed position and the effects of S would be significant.

Similarly should the pressure in passage 8 and chamber 7 be increased, due to some restriction downstream, then the pressure in chambers 5 and 9 would increase a lesser amount, and the forces tending to open the valve would exceed the forces tending to close the valve. The valve opening would increase in area, increasing the pressure in chambers 5 and 9 until the conditions for equilibrium were again obtained according to the above discussion. The valve would then be in a more open position and the effects of S would again be significant.

From the above it will be apparent that the accuracy of the amplifier segment 1a, operating alone, would be affected by the upstream and downstream pressures because of the inherent spring rates, or "droop," of the bellows 2a and 2b.

As is well known to those skilled in the art, when fluid flow occurs through two sharp edge orifices in series, the ratio of the pressure drops through the orifices is in an inverse ratio of the squares of the areas of the two orifices. If the upstream orifice area is $b$ and the downstream orifice area is $c$, then the pressure drop across the downstream orifice is to the pressure drop across the upstream orifice as $b^2$ is to $c^2$.

If a constant ratio of the two pressure drops is maintained by adjusting orifice area $b$, it will be found that $b$ will equal $c$ times the square root of the ratio of the downstream pressure drop to the upstream pressure drop. For any one value of $c$ and any one ratio of pressure drops, area $b$ will remain constant.

By using this information, I find that by maintaining a constant ratio between $(P_4-P_5)$ and $(P_5-P_7)$, and with a fixed orifice 6 having a constant area of $c$, then $b$, the orifice area across valve edge 11a will remain constant.

This means that if $P_4$ is regulated so that $$\left(\frac{P_4-P_5}{P_5-P_7}\right)=\frac{c^2}{b^2}$$

where $b$ is the valve orifice area when the valve is in the aforesaid normal position, and $c$ is the fixed area of orifice 6, under these conditions, in equilibrium condition, the bellows spring effect, or "droop," S becomes zero.

With S equal to zero, then $(P_5-P_7)$ will be directly proportional to $(P_{s2}-P_{s1})$, with no droop due to spring rate or extraneous factors.

The maintenance of S equal to zero is accomplished by the use of the amplifier stabilizer 1b. This unit has no spring, and thus has no spring rate. The stabilizer includes a valve pin 11 having a valve edge 11c with a cross sectional area of $V_1$. A diaphragm or piston 12 connected to valve pin 11 has an effective area D. Upper chamber 13 formed in the stabilizer communicates with the chamber 7 in segment 1a through passage 3a and is subject to pressure $P_7$. Chambers 14 and 15 communicate with chamber 4 through passage 3 and are subject to pressure $P_4$. Lower chamber 16 in unit 1b communicates with chambers 9 and 5 in segment 1a through passage 3b and is subject to pressure $P_5$. Supply pressure is provided in the passage 17 which is the inlet to the stabilizer.

It may be seen that:

$$P_4V_1+P_5D=P_7V_1+P_4V_1+P_4(D-V_1)$$

so $$P_4V_1-P_7V_1=P_4D-P_5D$$

adding $$P_5V_1-P_4V_1=P_5V_1-P_4V_1$$

we have $$(P_5-P_7)V_1=(P_4-P_5)(D-V_1)$$

and $$\left(\frac{P_4-P_5}{P_5-P_7}\right)=\frac{V_1}{(D-V_1)}$$

Thus, it can be seen that $$\frac{c^2}{b^2}=\frac{V_1}{D-V_1}$$

is designed in the invention embodiment and $P_4$ will be under constant control to maintain this condition. No droop can occur in the operation of the amplifier as stabilized in accordance with the invention. There is no spring and no rate in the stabilizer and the valve 1 will necessarily establish a predetermined position. Therefore $(P_5-P_7)$ will be directly proportional to the input signal $(P_{s2}-P_{s1})$ in the amplifier without droop. This proportion as previously indicated is a constant.

The ratio of pressure drops in the instance of fluid flow through two sharp edged orifices in series as is present in the invention amplifier design and related to the stabilizer incorporated therewith has been defined above. The invention embodiment of Figs. 1 and 2 has also been explained and it has been mathematically established that irrespective of supply pressure a particular stabilizing of valve element 1 must continuously occur in the function of the amplifier so as to maintain the orifice which is defined at 11a whereby "droop" of necessity must be non-existent in the function of the amplifier. In the stabilizer design as related to the amplifier a proportion of pressure drop exists which makes $$\frac{P_4-P_5}{P_5-P_7}=\frac{V_1}{D-V_1}$$

in any event. Also the disclosed amplifier structure necessarily provides $$\frac{P_4-P_5}{P_5-P_7}=\frac{C^2}{B^2}$$

It is therefore insured that $$\frac{V_1}{D-V_1}=\frac{C^2}{B^2}$$

in the first instance. As a result, the invention system will be caused to be in equilibrium at all times except for a transient function of the stabilizer since $P_4$, $P_5$ and $P_7$ are so related in the stabilizer and amplifier portions of the unit that the proportion of $$\frac{C^2}{B^2}$$

will be maintained and thereby the orifice defined at 11a will be maintained. This eliminates any effect of spring rate. Actual test proves the stabilizing action is so fast that it is hardly observable, for example that a rise in line pressure has occurred at the inlet to the amplifier, except by instrumentation connected to line pressure.

Let us consider what occurs when the amplifier is faced with an increase in supply pressure, the outlet pressure remaining constant and therefore the pressure in the amplifier chambers 7 and 13 remaining constant. The supply fluid under the influence of the increased pressure moves past edge 11c of valve 11 and simultaneously will inherently increase the pressure in chambers 14, 15 and 4 but to a lesser degree than the supply pressure is increased. This pressure rise will also appear in chambers 5, 9 and 16, but to a still lesser degree. This is inherent due to the series relation of the orifices in the structure as provided. Substantially simultaneously the diaphragm 12 is subjected to increased pressure in chamber 15 and bellows 2b is subjected to increased pressure in chamber 9. The pressure increase in 9 causes valve 1 to transiently move toward a closed position. This causes an inherent reduction in the pressure rise in chambers 5, 9 and 16 which are in free communication and a corresponding increase in the pressure rise in chambers 4, 14 and 15 under the influence of the increased pressure at 17.

With reference to the diaphragm 12, the increase in pressure in chambers 14 and 15 is greater than the increase in 16 causing a displacement of the valve 11 toward a closing position. The effect of this is to naturally reduce the pressure in 14, 15 and 4 due to the restriction of the orifice at 11c until a balance is reached to provide the proportionalities originally provided in the system, namely $$\frac{P_4 - P_5}{P_5 - P_7} =$$

the designed constant. As this occurs, the free communication between the amplifier and its stabilizer must necessarily provide that the valve 1 moves to the position whereby the area of orifice 11a is a corresponding proportion of the area of orifice 6 as originally designed.

Please note that an important advantage of the amplifier 11', above described is that pressures at its output ports, available at passages 8 and 19' and 10, if necessary, are liquid pressures and may be thus more readily used to oppose other liquid pressures, whereas the use of air or other gas pressure opposing liquid has disadvantages in many applications.

As shown in Figure 1, the respective segments 1a and 1b are provided with suitable end caps 18b and 18a and are provided at said end caps with suitable sealing rings 19 of deformable resilient material.

It will be further noted that the main amplifier segment 1a has the passage 10 communicating with the space 4 in which the pressure $P_4$ is developed and has the passage 19' communicating with the space 9 in which the pressure $P_5$ is developed. For purposes of the above discussion no flow occurs in passages 10 and 19', which may be accomplished, for example, by closing off said passages 10 and 19'. As will become apparent presently, it may be desirable when employing the amplifier to connect one of the passages to another element to serve either as a discharge or signal port to utilize the pressure $P_4$ or $P_5$ in the computation of a specified function of the signal input pressure differential. As above explained, this differential is $P_{s2}-P_{s1}$. $P_{s2}$ is applied to the interior of the bottom bellows 2b through a passage 20' in the bottom end cap, communicating with bellows 2b. The pressure $P_{s1}$ may be applied to the interior of the upper bellows 2a through a suitable conduit communicating therewith, such as the conduit 21'. Where the upper bellows 2a is to be evacuated, whereby the pressure $P_{s1}$ is substantially zero, this may be accomplished by exhausting the bellows through the conduit 21' and then crimping said conduit to seal same.

As has been demonstrated above $$(P_5 - P_7) = K_1(P_{s2} - P_{s1})$$

Then, with a constant signal pressure differential $(P_{s2}-P_{s1})$, the difference in pressures in chambers 5 and 7, namely $(P_5-P_7)$, remains a constant regardless of supply pressure. Therefore, with $P_7$, the downstream pressure, remaining constant, $P_5$ remains constant and will not vary, regardless of a changing supply pressure in passage 17 of Figure 1.

This may be stated more generally as follows: When only the supply pressure in passage 17 is increased or reduced, no change in pressure will take place in any other passage or chamber. When only the downstream pressure, $P_7$, is increased or reduced, all pressures downstream from passage 17 will follow $P_7$ so that the pressure in any of the passages or chambers downstream from passage 17 will exceed $P_7$ by constant values. This constant differential is changed only by changing the differences between the signal pressures $P_{s1}$ and $P_{s2}$. This provides the "no droop" character of performance of the amplifier.

The only result of a varying supply pressure in passage 17 would be a change in the position of valve edge 11c.

Figure 7:
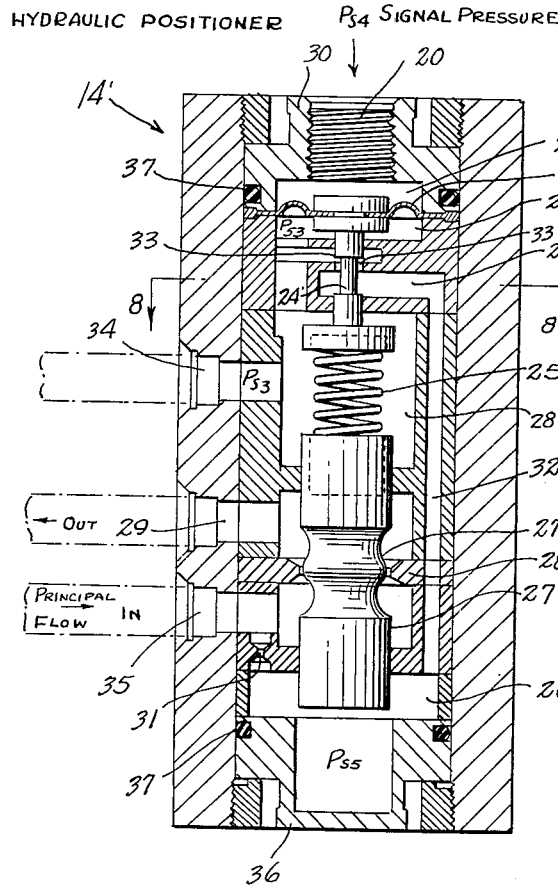
Figure 7 is a vertical cross sectional view taken through a hydraulic positioner element constructed in accordance with the present invention, employed to position a metering valve in accordance with a signal pressure applied to the hydraulic positioner element, without droop or discrepancies from other factors.
Figure 8:
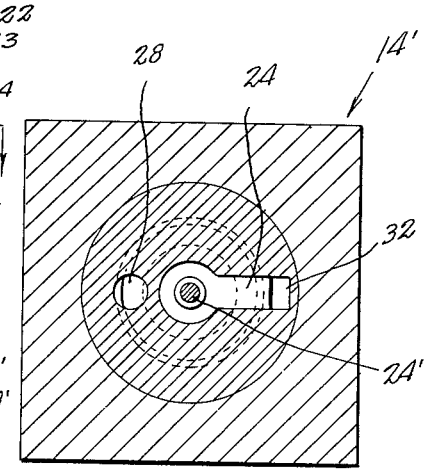
Figure 8 is a horizontal cross sectional view taken through the hydraulic positioner element of Figure 7, on the line 8—8 of Figure 7.

Referring now to Figures 7 and 8, the reference numeral 14' generally designates a "hydraulic positioner" whose function is to position a metering valve in accordance with a signal pressure, without droop or discrepancies from other factors.

The "hydraulic positioner" 14' is provided with a metering pin 27 having a contoured metering portion 27' which is movable with respect to the apertured metering plate 28', defining a variable annular restriction with respect thereto. The principal flow is through a passage 35, through the restriction between the contoured portion 27' of the metering pin and the aperture of the plate 28' and out through a passage 29. A control flow is from passage 35 through a fixed area orifice 31 into the space 26 below the pin 27. From space 26 the control flow is through a longitudinal passage 32 to a space 24 in which is provided a valve pin 24' having the valve edge 33 cooperating with a valve aperture 33', whereby the space 24 communicates with a space 28. The space 28 communicates with a passage 34 which is at a low pressure $P_{s3}$.

A signal pressure $P_{s4}$, supplied through a passage 20 into a chamber 21 above a diaphragm 22 connected to the valve pin 24', exerts a force on said diaphragm 22. Diaphragm 22 has an area of $D_2$. This force is opposed by the pressure $P_{s3}$ in chamber 23 acting from beneath on the diaphragm 22, and thus acting on an area $D_2$ less the area $V_2$ of the control valve 24'. In the space 28, the pressure $P_{s3}$ acts on the area $V_2$ of the control valve 24', and also acting on the diaphragm 22 from beneath is a coiled spring 25, said spring being suitably secured at its ends to pins 27 and 24' and having a spring force $S_2$. Thus $$P_{s4}D_2 - P_{s3}(D_2 - V_2) - P_{s3}V_2 = S_2$$

therefore, due to increase in the value of $$P_{s4}D_2(P_{s4} - P_{s3}) = S_2$$

the force of coil spring 25.

Should the force of the spring 25 be less than $D_2(P_{s4}-P_{s3})$, the valve edge 33 of the control valve pin 24' will move towards closing position. The pressure in chamber 26, designated at $P_{s5}$, will then increase, pushing the metering pin 27 against the forces of $P_{s3}$ in chamber 28 and the spring 25 until $S_2$ again is equal to $D_2(P_{s4}-P_{s3})$.

Should the force of the spring 25 be more than $D_2(P_{s4}-P_{s3})$, due to increase in value of $P_{s4}$, the valve edge 33 will move toward a more open position, lowering the pressure in chamber 26 to less than the combined forces of the spring 25 and the pressure $P_{s3}$ on the end of the metering pin 27 in the space 28. The metering pin 27 will then move away from the spring 25, reducing the spring force $S_2$, until the valve edge 33 moves sufficiently toward a closing position to raise the pressure $P_{s5}$ in chamber 26 to a value which satisfies the equation last above written. Any extraneous force on the pin 27 which would tend to move it toward chamber 26 would only cause the pressure $P_{s5}$ in chamber 26 to increase and oppose such extraneous force without producing any effect on the position of the metering pin 27.

The hydraulic positioner 14' is provided with suitable end caps 30 and 36 and with sealing rings 37 of deformable resilient material.

Figure 3:
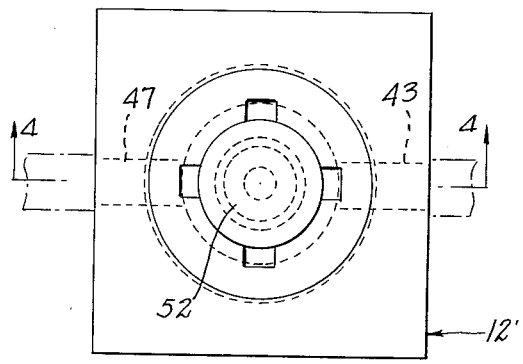
Figure 3 is a top view of a pressure drop regulator element, constructed in accordance with the present invention, to regulate the pressure drop across a fixed or variable orifice, said pressure drop being controlled by and being a fixed multiple of a signal pressure differential applied to the element.
Figure 4:
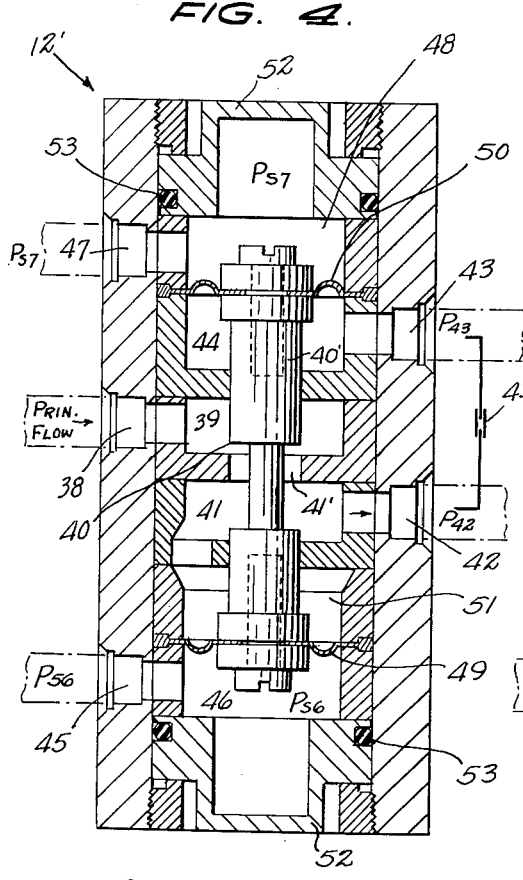
Figure 4 is a vertical cross sectional view through the pressure drop regulator of Figure 3, taken on the line 4—4 of Figure 3.

Referring now to Figures 3 and 4, the reference numeral 12' generally designates a "pressure drop regulator" whose purpose is to regulate the pressure drop across a fixed or variable orifice, such as the orifice 43' shown diagrammatically in Figure 4. The pressure drop is to be controlled by and is to be a fixed multiple of a signal pressure differential.

The principal flow, which is to pass the above-mentioned orifice 43', enters the pressure drop regulator through a passage 38, passes through a chamber 39, and passes the edge 40 of a valve 40' into a chamber 41 through the valve orifice 41'. From chamber 41 the flow passes through a passage 42 to the orifice 43'.

The upstream side of the orifice 43' will then have a pressure designated at $P_{42}$, while the downstream side of the orifice 43' will have a pressure designated as $P_{43}$. The pressure drop across the orifice 43' would then be $P_{42}-P_{43}$. Passage 43 leads to a space 44 in the pressure drop regulator below a diaphragm 50 to which the valve 40' is centrally secured, as shown. Space 44 and passage 43 communicate with the downstream side of the orifice 43', so that space 44 is subject to pressure $P_{43}$.

The lower end of the pin 40' is centrally connected to a bottom diaphragm 49 having the same area as the top diaphragm 50.

A signal pressure $P_{s6}$ is fed through a passage 45 into the chamber 46 below the diaphragm 49. Another signal pressure $P_{s7}$ is supplied through a passage 47 into a chamber 48 above diaphragm 50. The diaphragms 49 and 50 have the same area, designated as $D_3$. The pressure $P_{s6}$ thus exerts pressure on diaphragm 49 resulting in a total force of $P_{s6}D_3$.

The pressure $P_{s7}$ exerts a force on the diaphragm 50 equal to $P_{s7}D_3$. The pressure $P_{42}$ in chamber 51 exerts a net force of $P_{42}(D_3-V_3)$ on diaphragm 49, while the pressure $P_{43}$ exerts a net force on diaphragm 50 of $P_{43}(D_3-V_3)$, where $V_3$ is the area of the valve pin 40'. It may be seen then that $$P_{32}(D_3-V_3)+P_{s6}D_3=P_{42}(D_3-V_3)+P_{s7}D_3$$

Therefore $$(P_{42}-P_{43})=(P_{s6}-P_{s7})\frac{D_3}{D_3-V_3}$$

and as $D_3$ divided by $D_3-V_3$ is a fixed value $(P_{42}-P_{43})$, the pressure drop across the aforementioned orifice 43', is a direct multiple of $(P_{s6}-P_{s7})$.

The above described arrangement is employed when it is desired to have the "pressure drop regulator" located upstream of the orifice 43'. Should it be desired to place the pressure drop regulator downstream of the said orifice, then the arrangement of the valve pin is merely reversed. Thus, after passing the orifice 43', the flow enters the pressure drop regulator through the passage 42 to the chamber 41, passing the valve edge 40 to chamber 39 and then passing to the passage 38. The passage 43 would be connected to the upstream side of the orifice 43'. Thus the pressure drop across the orifice 43' is $(P_{43}-P_{42})$.

Under these conditions $P_{s6}$ must now be considered as the lower of the pressure signals and $P_{s7}$ as the higher of the pressure signals. We now see that $$(P_{s7}D_3+P_{42}(D_3-V_3)=P_{s6}D_3+P_{43}(D_3-V_3)$$

and thus $$(P_{s7}-P_{s6})\left(\frac{D_3}{D_3-V_3}\right)=P_{43}-P_{42}$$

the pressure drop across the aforementioned orifice 43'.

The pressure drop regulator 12' is provided with suitable end caps 52 and with sealing rings 53 of deformable resilient material, as shown in Figure 4.

Figure 5:
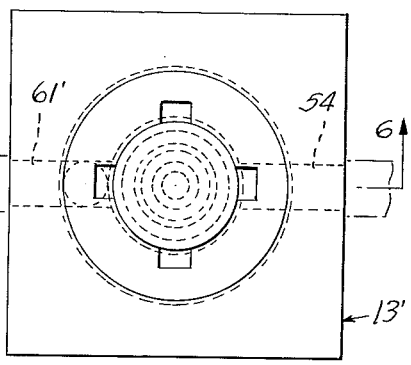
Figure 5 is a top plan view of a metering valve element constructed in accordance with the present invention, providing an orifice area which is a function of a signal pressure differential applied to the element.
Figure 6:
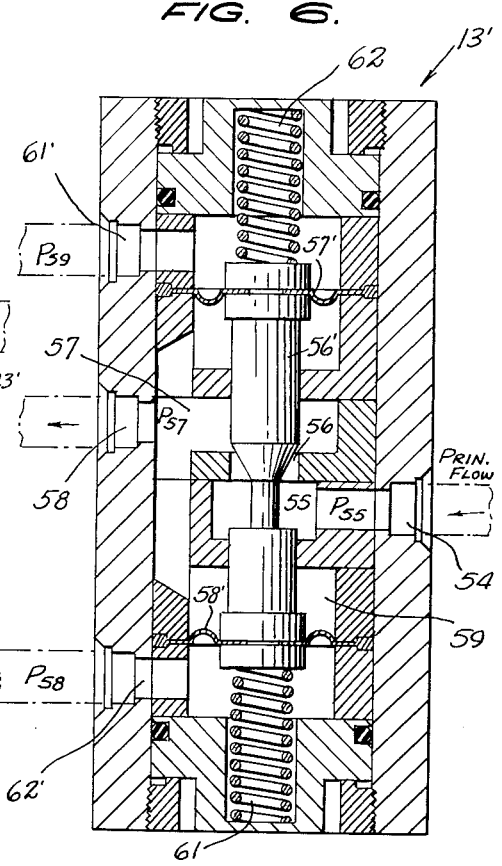
Figure 6 is a vertical cross sectional view taken through the metering valve of Figure 5 on the line 6—6 of Figure 5.

Referring now to Figures 5 and 6, the reference numeral 13' generally designates a "metering valve" whose purpose is to provide an orifice area which is a function of (not necessarily a multiple of) a signal pressure differential.

In the metering valve 13', the flow is through a passage 54 into a chamber 55 and past a metering orifice 56 to a chamber 57, and out of the device through a passage 58. The metering orifice 56 is varied according to the movement of a metering pin 56' which is secured at its opposite end portions to respective diaphragms 57' and 58', the diaphragm 57' being located above the space 57 and the diaphragm 58' being located at the bottom of the space 59, as shown in Figure 6. Respective coiled springs 62 and 61 act on the top and bottom ends of the metering pin 56'.

As chambers 57 and 59 are interconnected, they are both at the same pressure, namely, a pressure $P_{57}$. As all areas subjected to this pressure $P_{57}$ are balanced, no net force is applied on the metering pin 56' from the pressure $P_{57}$, or the pressure $P_{55}$ in the chamber 55. By contouring the pin 56' suitably and by providing suitable linear spring rate in the springs 61 and 62, an effective orifice 56 may be obtained which is any function of the signal pressure differentials $P_{s8}-P_{s9}$, the difference between a first signal pressure $P_{s9}$ applied through a passage 61' to the space above diaphragm 57' and a signal pressure $P_{s8}$ applied through a passage 62' to the space below diaphragm 58'.

In the arrangement of Figures 5 and 6 it has been found to be not practical to use functions outside the limits of Orifice area $=K(P_{s8}-P_{s9})^{1/2}$, and
Orifice area $=K(P_{s8}-P_{s9})^2$ Summarizing the foregoing discussion, it may be stated:

(A) *For the amplifier 11'*

$\Delta P=P_5-P_7=K_1(P_{s2}-P_{s1})=K_1\Delta P_s$ where $K_1$ is a design constant, $\Delta P$ is the pressure difference between the fluid pressure $P_5$ at the conduit passage 19' and the fluid pressure $P_7$ at the outlet passage 8, $P_{s2}$ is the signal pressure at the passage 20' and $P_{s1}$ is the signal pressure at the conduit 21', $\Delta P_s$ being the difference between the two signal pressures $P_{s2}$ and $P_{s1}$.

(B) *For the pressure drop regulator 12'*

$\Delta P=P_{42}-P_{43}=K_2(P_{s6}-P_{s7})$, where the orifice is located upstream of the device, and $\Delta P=P_{43}-P_{42}=K_2(P_{s7}-P_{s6})$, where the orifice is located downstream with respect to the device, or, generalizing $\Delta P=K_2\Delta P_s$, where $K_2$ is a design constant, $P_{43}$ is the fluid pressure at the passage 43, $P_{42}$ is the fluid pressure at the passage 42, $P_{s6}$ is the signal pressure at the passage 45, $P_{s7}$ is the signal pressure at the passage 47, $\Delta P$ is the difference between the pressures $P_{43}$ and $P_{42}$, and $\Delta P_s$ is the difference between the signal pressures $P_{s6}$ and $P_{s7}$.

(C) *For the metering valve 13'*

Orifice area $=K_3(P_{s8}-P_{s9})^X=K_3\Delta P_s^X$, where $K_3$ is a design constant, $P_{s8}$ is a fluid pressure at the passage 62', $P_{s9}$ is a fluid pressure at the passage 61', $\Delta P_s$ is the difference between the signal pressures $P_{s8}$ and $P_{s9}$, and $X$ may have a value between one-half and two.

(D) *For the hydraulic positioner 14'*

$S_4=K_4(P_{s4}-P_{s3})=K_4\Delta P_s$, where $S_4$ is the effective pressure acting on the spring 25, $K_4$ is a design constant, $P_{s4}$ is the signal pressure at the passage 20, $P_{s3}$ is the signal pressure at the passage 34, and $\Delta P_s$ is the difference between the signal pressures $P_{s4}$ and $P_{s3}$.

As will be readily apparent, the devices heretofore described and designated 11′, 12′, 13′ and 14′ may be employed in various interconnected arrangements, for example, in the arrangements illustrated schematically in Figures 10 to 13, ranging from arrangements to perform simple computations to arrangements to perform complex specialized computations, such as to control the flow of fuel in an aircraft engine.

For purposes of further discussion the following facts must be established. Flow in the instance of each of the schematic arrangements shown is with respect to sharp edged orifices and therefore directly proportioned to the square root of the differential of pressure to either side of any sharp edged orifice therein. Also, relations between pressure drops of any two orifices in series are irrespective of density. For that matter the invention systems employ only a single fluid at any one time with a condition of substantially constant temperature and density. Moreover, as the computer systems illustrated use pressure differentials as signals and deliver pressure signals at their output, variations in flow intermediately of orifices therein have no impact on their pressure output.

As any one fixed orifice has but one coefficient of discharge within the flow ranges of the computing systems as shown herein, the "effective area" of the orifice incorporating this coefficient may be designated $A_e$. As will be pointed out hereinafter, the temperature and density changes are irrelevant in the invention systems except in an instance where the intermediate flow may become of interest. For the invention systems it has been found the flow for any given density may be said to be proportioned to $A_e\sqrt{\Delta P}$ where $\Delta P$ is equal to the pressure differential across a fixed orifice provided in the invention system.

Further, $F = K_{10} A_e \sqrt{\Delta P}$ where F is flow in lbs./unit time, $A_e$ is effective area of the orifices, $\Delta P$ is pressure differential causing the flow and $K_{10}$ is a constant depending on the units embodied; $K_{10}$ may be so selected that $F = A_e \sqrt{\Delta P}$ when F is unity flow, namely 1 lb. per hour; $A_e$ is 1 sq. in., and P is 1 lb./in.$^2$ or 1 inch.

In further developing the explanation of the computing systems of the present invention, discussion of constants will be omitted, as constants in practice can be taken care of by the suitable design or orifice areas, diaphragm areas, valve areas, spring rates, and the like. Therefore, we recite equivalents which are in fact proportionalities in describing the systems illustrated.

Figure 12 shows a schematic arrangement for deriving the expression $$\Delta P_1 = \frac{1}{\Delta P_s}$$

where $\Delta P_1$ is output pressure and $\Delta P_s$ is the signal pressure applied. The schematic arrangement of Figure 14 employs a metering valve 13′ wherein the passage 62′ of the metering valve is connected to the passage 19′ of the amplifier 11′ and the passages 61′ and 54 of the metering valve are connected to the passage 8 of the amplifier 11′. The fluid flow leaves the device at the passage 58 of metering valve 13′ and enters the device at the passage 17 of the amplifier 11′. The signal pressure differential $\Delta P_s$ is applied across the passages 20′ and 21′ of the amplifier 11′, the higher pressure value being applied at the passage 20′. The passage 10 of the amplifier is sealed so that no flow occurs therethrough.

The orifice area of the metering valve 13′ in Figure 12 is arranged to have an orifice area equal to $\Delta P_s$. The flow through the amplifier 11′ is inherently proportioned to $\sqrt{\Delta = P_s}$ and passes the metering valve 13′ which has an orifice area of $\Delta P_s$.

Since the output flow F equals $A_e$ times the square root of $\Delta P_1$, wherein $\Delta P_1$ is the output pressure, we may write $$\Delta P_1 = \frac{F^2}{A_e^2}$$

But F equals the square root of $\Delta P_s$ and $A_e$ equals $\Delta P_s$. Substituting in the preceding equation, we therefore have $$\Delta P_1 = \frac{\Delta P_s}{(\Delta P_s)^2} = \frac{1}{\Delta P_s}$$

In the arrangement of Figure 12, a constant pressure drop may be obtained by contouring the metering pin 56′ of the metering valve 13′ to a suitable curve such that $A_e$ equals the square root of $\Delta P_s$. Then the above expression $$\Delta P_1 = \frac{F^2}{A_e^2}$$

becomes $$\Delta P_1 = \frac{\Delta P_s}{\Delta P_s} = 1$$

The result obtained, namely, constant pressure drop, may also be accomplished by schematic arrangement such as that shown in Figure 13, employing only a metering valve 13′ and a fixed orifice 80. The fluid pressure on the input side of the device is designated as $P_1$ and the fluid pressure leaving the orifice 80 is designated as $P_2$. The pressure $P_1$ is applied to the passage 62′ of the metering valve 13′, and the fluid pressure $P_2$ is applied to the passages 61′ and 54 of the metering valve, as shown. The metering pin 56′ of the metering valve is contoured to a curve corresponding to the square root of $(P_1 - P_2)$. Regardless of the value of the flow F, $P_1 - P_2$ equals $F^2$. Also $A_e = \sqrt{(P_1 - P_2)} = F$ $$(P_2 - P_0) = \frac{F^2}{A_e^2}$$

where $P_0$ is the fluid pressure at the passage 58 of the metering valve 13′ and the pressure differential $P_2 - P_0$ is the pressure drop across the orifice of the metering valve. Substituting for F and $A_e$ we then have $$(P_2 - P_0) = \frac{P_1 - P_2}{P_1 - P_2} = \text{unity}$$

It is to be noted that in the computer of Figure 12, the desired function, namely $\Delta P_1$ is obtained between conduit 8 of the amplifier 11′ and the outlet conduit 58 of the metering valve 13′, the desired function $\Delta P_1$ being equal to the reciprocal of the applied signal differential $\Delta P_s$, as indicated in Figure 12. Similarly, in Figure 15, the desired function $\Delta P_2$ is obtained between the conduit 61′ and the conduit 58 of the metering valve 13′.

Multiplication of two signal pressures may be performed by a computer such as that shown diagrammatically in Figure 10, and designated generally by the reference numeral 100. The computer 100 comprises respective amplifiers 101 and 102, a metering valve 103 and a pressure drop regulator 104, interconnected, as shown, the output conduit 58 of the metering valve 103 passing through a fixed orifice 105 having an area of z. One input signal differential $P_a - P_0$ is applied to the amplifier 101 at the point conduits 20′ and 21′ thereof, as shown. The other input signal differential $P_b - P_0$ is applied to the amplifier 102 at the signal input conduits 20′ and 21′ thereof, as illustrated.

The pressure responsive orifice of the metering valve 103 is contoured to conform with the expression $$A_e = \sqrt{(P_a - P_0)}$$

The input signal $(P_a - P_0)$ passes its amplifier 101 and is applied to the metering valve 103 across the conduits 61′ and 62′ thereof. The input signal $(P_b - P_0)$ passes its amplifier 102 and is applied as the input signal to the pressure drop regulator 104 across the signal input conduits 47 and 45 thereof. The output pressure differential from the pressure drop regulator across the conduits 42 and 43' of said pressure drop regulator is therefore $(P_b-P_0)$, and this pressure differential is connected across the conduits 54 and 58 of the metering valve 103, as shown. The flow F, which is equal to $A_e\sqrt{\Delta P}$ will then be expressed by the equation $$F=(\sqrt{P_a-P_0})(\sqrt{P_b-P_0})$$

This flow passing the fixed orifice z will generate a pressure differential of $\Delta P_3$ according to the following expression $$\Delta P_3=\frac{(\sqrt{P_a-P_0}\times\sqrt{P_b-P_0})^2}{z^2}$$

Omitting the constant, which can be accomplished by suitable design, the expression for $\Delta P_3$ becomes the following $$\Delta P_3=(P_a-P_0)(P_b-P_0)$$

which is the desired function to be obtained by the computer 100. This value will be obtained between the conduits 8 of the amplifiers and the conduit 43' of the pressure drop regulator 104, as shown in Figure 10.

Divisions of two signal pressures or pressure ratio therebetween may be computed by employing a system of elements such as that illustrated in Figure 11 and designated generally at 106. The computer 106 comprises the respective amplifiers 107 and 108 interconnected through a metering valve 109 in the manner shown. As illustrated, the input signal differential $P_c-P_0$ is applied across the input signal conduits 20' and 21' of the amplifier 107 and the flow from the conduit 8 of amplifier 107 is connected to the conduit 58 of the metering valve 109, the conduits 10 and 19' of amplifier 107 being closed. The signal differential $P_d-P_0$ is applied to the respective signal input conduits 20' and 21' of the amplifier 108, as shown, and the output conduit 19' of amplifier 108 is connected to the signal input conduit 61' of the metering valve 109. The output flow conduit 8 of the amplifier 108 is connected to the signal input conduit 62' of metering valve 109. The output flow conduit 54 of the metering valve 109 is connected to the output flow line, shown at 110, to which conduit 8 of amplifier 108 is also connected.

The pressure input signal $(P_c-P_0)$ is amplified in amplifier 107 and the flow therefrom is equal to $\sqrt{P_c-P_0}$, as indicated in Figure 11. The pressure-responsive valve element of the metering valve 109 is contoured to the expression $$A_e=\sqrt{P_d-P_0}$$

The signal output pressure from the amplifier 108 is $(P_d-P_0)$ which is applied to the metering valve. Thus $$\frac{F^2}{A_e^2}=\Delta P_4$$

where $\Delta P_4$ is the pressure appearing across conduit 58 of metering valve 109 and the output line 110. However, the flow F is given by $$F=\sqrt{P_c-P_0}$$

and $$A_e=\sqrt{P_d-P_0}$$

Therefore $$\Delta P_4=\left(\frac{\sqrt{P_c-P_0}}{\sqrt{P_d-P_0}}\right)^2$$

and $$\Delta P_4=\frac{(P_c-P_0)}{(P_d-P_0)}$$

the desired function to be computed.

If $P_0$ is a vacuum, then one input pressure will be $P_c$ and the other input pressure will be $P_d$ and the function generated will be the pressure ratio of $P_c$ to $P_d$.

From the above discussion it will now be apparent that systems may be devised in accordance with the present invention to compute various desired functions of the signal input differentials.

In any of the computers above described, or in other computers which may be devised employing elements of the present invention, hydraulic positioners 14' may be substituted for metering valves in any place where friction or hysteresis is appreciable, for increasing the sensitivity of the arrangement.

In Figure 9 the curve 203 represents, for a particular engine, the characteristic $$\frac{W_f}{P_c\sqrt{\theta}}$$

wherein $W_f$ is the mass rate of fuel flow, $P_c$ is the compressor discharge pressure, and $\theta$ is the temperature. This function is plotted against the ratio of compressor discharge pressure to compressor inlet pressure, namely, the expression $$\frac{P_c}{P_d}$$

wherein $P_c$ is the compressor discharge pressure and $P_d$ is the compressor inlet pressure.

Obviously, the expression $P_c$ divided by $P_d$ changes over the operating range of the engine, particularly with changes in engine speed, and the curve 203 represents an inherent characteristic of the engine.

While certain specific embodiments, systems and applications of the invention have been disclosed herein it should be readily apparent the invention, its application and embodiments are not so limited.

What is claimed is:

1. A computer comprising a first amplifier having a pressure signal input port, means for applying a first pressure signal to said input port, an output port, and means to develop a first output pressure at said output port proportional to the signal pressure at said input port, a second amplifier having a pressure signal input port, means to apply a second pressure signal to said second-named input port, an output port, and means to develop a second output pressure at said second-named output port proportional to said second pressure signal, a metering valve having a variable orifice and pressure-responsive means arranged to vary said orifice, each amplifier having a fluid flow passage including an inlet port and an outlet port, a common fluid supply line connecting the inlet ports of the amplifiers, a return line connected to the outlet port of the second amplifier, conduit means connecting said variable orifice between the outlet port of the first amplifier and said return line, and means connecting said pressure-responsive means between said return line and the output port of the second amplifier.

2. A computer comprising a first amplifier having a pressure signal input port, means for applying a first pressure signal to said input port, an output port, and means to develop a first output pressure at said output port proportional to the signal pressure at said input port, a second amplifier having a pressure signal input port, means to apply a second pressure signal to said second-named input port, an output port, and means to develop a second output pressure at said second-named output port proportional to said second pressure signal, a metering valve having a movable valve element arranged to define a variable orifice, said movable valve element being contoured in accordance with a function of the square root of the second pressure signal, pressure-responsive means arranged to move said valve element, whereby to vary the orifice defined thereby in accordance with said function, each amplifier having a fluid flow passage including an inlet port and an outlet port, a common fluid supply line connecting the inlet ports of the amplifiers, a return line connected to the outlet port of the second amplifier, conduit means connecting said variable orifice between the outlet port of the first amplifier and said return line, and means connecting said pressure-responsive means between said return line and the output port of the second amplifier, whereby the pressure differential between the upstream side of said variable orifice and said return line is proportional to the ratio of the signal pressures.

3. A computer comprising a fluid supply line, a fluid return line, a first amplifier connected between said lines and arranged to pass fluid therethrough, a pressure signal input port in said first amplifier, means to apply a first pressure signal to said signal input port, an output port in said first amplifier, means to develop a pressure at said output port proportional to said first pressure signal, a second amplifier connected between said lines and arranged to pass fluid therethrough, a pressure signal input port in said second amplifier, means to apply a second pressure signal to said last-named signal input port, an output port in said second amplifier, means to develop a pressure at said second output port proportional to said second pressure signal, a metering valve having a variable orifice and pressure-responsive means arranged to vary said orifice, means connecting said pressure-responsive means between the output port of the first amplifier and said return line, a pressure drop regulator connected between the output port of the second amplifier and said return line, means connecting said pressure drop regulator across said variable orifice and being arranged to vary the pressure drop across said variable orifice in accordance with the pressure at the output port of the second amplifier, and a conduit element having a fixed area orifice connected between one side of the variable orifice of said metering valve and said return line.

4. A computer comprising a fluid supply line, a fluid return line, a first amplifier connected between said lines and arranged to pass fluid therethrough, a pressure signal input port in said first amplifier, means to apply a first pressure signal to said signal input port, an output port in said first amplifier, means to develop a pressure at said output port proportional to said first pressure signal, a second amplifier connected between said lines and arranged to pass fluid therethrough, a pressure signal input port in said second amplifier, means to apply a second pressure signal to said last-named signal input port, an output port in said second amplifier, means to develop a pressure at said second output port proportional to said second pressure signal, a metering valve having a variable orifice and pressure-responsive means arranged to vary said orifice, means connecting said pressure-responsive means between the output port of the first amplifier and said return line, a pressure drop regulator connected between the output port of the second amplifier and said return line, means connecting said pressure drop regulator across said variable orifice and being arranged to vary the pressure drop across said variable orifice in accordance with the pressure at the output port of the second amplifier, and a conduit element having a fixed area orifice connected between the downstream side of the variable orifice of said metering valve and said return line, said variable orifice being arranged to vary in area as a function of the square root of the first signal input pressure, whereby the pressure differential between the downstream side of said variable orifice and said return line will be proportional to the product of said input signal pressures.

5. A computer comprising a fluid supply line, a fluid return line, a plurality of amplifiers connected to said fluid supply line, each amplifier having a pressure signal input port, means to apply respective pressure input signals to the signal input ports, each amplifier having an output port and being arranged to develop an output signal at said output port proportional to the input pressure signal applied to its signal input port, and pressure-responsive means interconnected with said signal output ports and said return line and arranged to develop a pressure differential with respect to said return line which is proportional to a predetermined algebraic expression of the input pressure signals.

6. A computer comprising a fluid supply line, a fluid return line, a plurality of amplifiers connected to said fluid supply line, each amplifier having a pressure signal input port, means to apply respective pressure input signals to the signal input ports, each amplifier having an output signal port and being arranged to develop an output signal at said output signal port proportional to the input signal pressure applied to its input signal port, a metering valve connected between the output port of one of the amplifiers and said return line, said metering valve having a variable orifice controlled by the output signal pressure at the output signal port of said one of the amplifiers, and means interconnected with said variable orifice and at least one of said lines and arranged to develop a pressure differential with respect to said return line which is proportional to a predetermined algebraic expression of the input pressure signals.

7. A computer comprising a fluid supply line, a fluid return line, a plurality of amplifiers connected to said fluid supply line, each amplifier having a pressure signal input port, means to apply respective pressure input signals to the signal input ports, each amplifier having an output signal port and being arranged to develop an output signal at said output signal port proportional to the input signal pressure applied to its input signal port, a metering valve connected between the output port of one of the amplifiers and said return line, said metering valve having a variable orifice controlled by the output signal pressure at the output signal port of said one of the amplifiers, a pressure drop regulator having a variable orifice and pressure-responsive means controlling said last-named variable orifice, and means interconnected with the variable orifices of said metering valve and said pressure drop regulator and at least one of said lines and being arranged to develop a pressure differential with respect to said return line which is proportional to a predetermined algebraic expression of the input pressure signals.

8. In a hydraulic computer, an amplifier comprising a housing formed with a fluid flow passage therethrough and an outlet to said passage, means defining a fixed orifice in said passage, means including a valve element positioned in said passage defining a variable control orifice therein, means defining a first output orifice in said housing communicating with said passage downstream of said control orifice, means defining a second output orifice in said housing communicating with said passage downstream of said control orifice, opposing bellows units in said housing respectively connected to opposite end portions of said valve element, means for applying signal pressures to said bellows units and regulating means connected in said housing operatively associated with said passage and valve element to maintain a control orifice of predetermined dimension whereby a differential pressure is established at said output orifices which is a direct and precise amplification of the differential signal pressure applied to said bellows units.

9. In a hydraulic computer, an amplifier device comprising a housing having means defining a fluid flow passage therein and in inlet thereto, means defining a fixed orifice in said passage, means including a valve element defining a variable flow restricting orifice in said passage, output ports defined in said housing connecting in said passage, means for applying a differential input signal to said valve element and regulating means in said housing operatively connected with said flow passage to regulate fluid pressures upstream and downstream of said variable orifice, inherently causing said valve element to establish a predetermined flow restricting orifice therein so the pressure differential at said output ports is proportional to the said differential input signal.

10. In a hydraulic computer, a device including a housing, a fluid flow passage in said housing, valve means defining a variable control orifice in said housing passage, means defining a fixed orifice in said passage to one side of said variable control orifice, means for applying a differential input signal to said valve means, means defining inlet to and output from said passage, means defining pressure chambers in said housing to either side of said fixed orifice and upstream and downstream of said control orifice operatively connected to said valve means, stabilizer means responsive to the pressures in said pressure chambers regulating pressures upstream and downstream of said control orifice on fluid flow through said inlet and operative to maintain a difference in pressure between the up and downstream sides of said control orifice which is proportional to the difference in pressure between up and downstream sides of the fixed orifice as the square of the area of the fixed orifice is to the square of the area of the control orifice whereby the differential pressure resulting at the output will be directly proportional to the said differential input signal applied to said valve means.

11. In a hydraulic computer, a housing defining a fluid flow passage having an inlet for introduction of fluid under line pressure, valve means defining a variable control orifice in said passage, means defining a fixed orifice in said passage, means defining pressure chambers in said housing to either side of the fixed orifice and operatively connecting to the up and downstream sides of said control orifice, means for delivery of fluid from said housing passage communicating with at least one of said pressure chambers, means for applying an input signal to said valve means, and regulating means interposed in said passage between said inlet and valve means operatively connected to said pressure chambers to maintain a differential pressure across said valve means which is directly proportional to said input signal irrespective of line pressure.

12. In a hydraulic computer, means defining a fluid flow passage having a fixed flow restricting orifice therein, means for introducing a fluid in said passage under line pressure, means for delivering the fluid from said passage, means interposed in said passage responsive to a differential input signal, means operatively connected to the up and downstream sides of said signal responsive means responsive to pressure of fluid in said passage and the pressures upstream and downstream of said signal responsive means regulating said signal responsive means to maintain a differential pressure thereacross which is directly proportional to the differential input signal whereby to impose a mathematical expression of said input signal on its output reflected in said fluid delivery means.

13. In a hydraulic computer, a housing having a fluid inlet passage and a fluid outlet passage, a flow passage connecting said inlet and outlet passages, a valve element for defining a flow restricting orifice in said flow passage, opposing bellows connected to opposite portions of said valve element, signal pressure conduits connected to said bellows for respectively applying input signals to the respective bellows and the valve element thereby, an output port defined in said housing to the downstream side of said orifice, means defining a flow restricting fixed orifice to the downstream side of said first mentioned orifice and regulating means interposed at said fluid inlet passage responsive to pressure differential across said first mentioned orifice, irrespective of fluid pressure in said passages, to maintain a pressure differential at said outlet passage and output port which is directly proportional to the differential of the signals applied to said bellows.

14. In a hydraulic computer, means defining a passage therein for movement of fluid therethrough having a fixed flow restricting orifice therein, means connected in said passage for receiving and transmitting opposed input signals, means interposed in said passage responsive to the fluid flow therein and responsive to the pressure differential across said means for transmitting input signals to maintain a differential pressure application on the latter to impose a mathematical expression of the differential of the input signals on its output.

15. In a hydraulic computer, an amplifier device comprising a housing having a fluid inlet, a fluid outlet and means defining a fluid flow passage therebetween, means for defining a variable flow restricting orifice in said passage, opposing bellows respectively connected to opposite ends of means for defining the variable flow restricting orifice having means for introducing opposed fluid input signal pressures therein, means defining an output port from said passage to the downstream side of said orifice, means defining a fixed restriction in said passage, means in said passage adjacent said inlet for defining an additional flow restricting orifice, a diaphragm responsive to fluid pressures up and downstream of said variable orifice controlling the last named means for stabilizing thereof irrespective of the pressure of the fluid at said inlet, said last named means and diaphragm being operative to maintain said means defining the variable orifice in a position inherently causing that the pressure differential at said outlet and output port is directly in proportion to the differential of the input signal pressures.

16. In a hydraulic computer, a housing having a fluid flow passage, an inlet to and outlet from said fluid flow passage and said housing, an output port connecting in said passage upstream of said first mentioned outlet, means defining a flow restricting fixed orifice in said passage, means defining a pair of variable flow restricting orifices in said passage between said inlet and said outlet and output port, said means defining variable flow restricting orifices including valve elements said fixed orifice being downstream of at least one of said valve elements, means connected to said one of said valve elements to apply an input signal to each of opposite end portions thereof, and further means connected to the other of said valve elements responsive to pressure of the fluid upstream and downstream of said one valve element and the fluid pressure at said inlet to maintain said one valve element in a position to define an orifice inherently causing the differential pressure between said outlet and the output port to be a constant proportion to the difference in the input signals applied to said one valve element.

17. In combination, an amplifier including a housing having a fluid flow passage and means defining fixed and variable flow restricting orifices therein, an inlet to and output ports from said passage, means for applying input pressure signals to the means defining a variable flow restricting orifice and regulating means in said passage responsive to pressures at said inlet and upstream and downstream of said variable flow restricting orifice to inherently develop a pressure differential at said output ports directly proportional to the pressure differential of said input signals.

18. In combination an amplifier having a fluid flow passage and means defining a fixed flow restricting orifice therein, means defining an inlet to and output from said passage, means defining a variable orifice in said passage, means for introducing an input signal to the fluid in said passage to act on said means defining the variable orifice, regulating means for fluid flow in said passage responsive to fluid pressure at said inlet and the pressures up and downstream of said means defining the variable orifice operative to position said means defining the variable orifice to maintain an output directly proportional to said input signal.

19. A computer comprising a fluid supply line, a return line, amplifier means having a fluid flow passage therethrough connected to said supply line and a plurality of output ports therein, means connected in said passage for applying opposed input pressure signals to the fluid flowing in said passage, regulating means in said passage providing pressure at said output ports proportional to the differential of said input signals and pressure responsive means connected across said output ports in communication therewith and with said return line operative to deliver fluid to said return line at a flow precisely related to the differential of said opposed input signals.

20. An amplifier device comprising a housing having inlet and outlet means and a fluid flow passage therebetween, means defining fixed and variable orifices in series in said passage, said means defining variable orifices including valve elements, means for applying input signals to opposite end portions of one of said valve elements, diaphragm means connected to the other of said valve elements responsive to fluid pressure at said inlet and up and downstream of said one valve element to stabilize said valve elements and inherently cause an output at said outlet means directly proportional to the applied input signals.

21. A computer comprising amplifier means having a fluid flow passage therethrough and inlet and outlet ports in communication therewith, flow restricting means in series in said passage, said flow restricting means including movable means responsive to a differential input signal to control the amplifier output and regulating means responsive to fluid pressures in said passage acting with said flow restricting means including said means responsive to the differential input signal to provide an amplifier output directly and precisely proportional to the differential input signal.

References Cited in the file of this patent

UNITED STATES PATENTS

| | | |
|---|---|---|
| 1,503,591 | Kerr et al. | Aug. 5, 1924 |
| 1,585,170 | Roucka | May 18, 1926 |
| 1,803,437 | Riney et al. | May 5, 1931 |
| 1,923,127 | Veenschoten | Aug. 22, 1933 |
| 2,041,863 | Rhodes | May 26, 1936 |
| 2,172,315 | Blasig | Sept. 5, 1939 |
| 2,304,323 | Wiegers | Dec. 8, 1942 |
| 2,339,753 | Bloom | Jan. 25, 1944 |
| 2,420,394 | Gilman | May 13, 1947 |
| 2,593,564 | Ives | Apr. 22, 1952 |
| 2,644,482 | McCallum | July 7, 1953 |
| 2,668,416 | Lee | Feb. 9, 1954 |
| 2,688,229 | Lee | Sept. 9, 1954 |
| 2,778,372 | Jaquith | Jan. 22, 1957 |
| 2,778,373 | Jaquith | Jan. 22, 1957 |

OTHER REFERENCES

Fluid Mechanics, by Daugherty & Ingersoll, fifth edition, 1954 (pp. 57 and 118–119).